US008781905B2

(12) United States Patent
Rau et al.

(10) Patent No.: US 8,781,905 B2
(45) Date of Patent: *Jul. 15, 2014

(54) SYSTEM AND METHOD FOR TRANSPONDER-ENABLED ACCOUNT TRANSACTIONS

(75) Inventors: Scott W. Rau, Pottstown, PA (US); Scott Philp Bertetti, Wilmington, DE (US); Gerald A. Beechum, Jr., Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 1152 days.

This patent is subject to a terminal disclaimer.

(21) Appl. No.: 11/437,534

(22) Filed: May 19, 2006

(65) Prior Publication Data

US 2007/0094084 A1 Apr. 26, 2007

Related U.S. Application Data

(63) Continuation of application No. 09/630,595, filed on Aug. 1, 2000, now abandoned.

(51) Int. Cl.
*G06Q 20/00* (2012.01)

(52) U.S. Cl.
USPC .................... 705/17; 705/16; 705/64; 705/65

(58) Field of Classification Search
None
See application file for complete search history.

(56) References Cited

U.S. PATENT DOCUMENTS 3,438,489 A 4/1969 Cambornac et al.
3,468,046 A 9/1969 Makishima
3,532,543 A 10/1970 Nole et al.
3,537,195 A 11/1970 Gerds
3,546,022 A 12/1970 Busch et al.
3,594,727 A 7/1971 Braun
3,617,638 A 11/1971 Jochimsen et al.
3,634,669 A 1/1972 Soumas et al.
3,637,990 A 1/1972 Bayha et al.

(Continued)

FOREIGN PATENT DOCUMENTS

CA 2293321 6/1998
DE 4239562 A1 6/1993

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — M. Thein
(74) *Attorney, Agent, or Firm* — Hunton & Williams LLP

(57) ABSTRACT

A transponder-initiated transaction system is electromagnetically coupled to an account transponder device at the point of sale. The account transponder device may be embedded within a watch, key chain or other personal article for convenience or affinity. The transponder device may communicate account information to an RF-enabled point of sale device, enabling transactions to take place without resort to remote data processing facilities. In other embodiments partial or complete account information may be accessed or stored at co-located or remote sources. New account registrants may access a Web site to enter a transponder ID and activate a new account, which may be a credit account, debit account, cash account, special purpose vending account, or other types of accounts.

19 Claims, 4 Drawing Sheets

(56) References Cited

U.S. PATENT DOCUMENTS 3,749,887 A 7/1973 Giuliani
3,806,369 A 4/1974 Dey et al.
3,914,762 A 10/1975 Klensch
3,938,090 A 2/1976 Borison et al.
3,946,206 A 3/1976 Darjany
4,047,033 A 9/1977 Malmberg et al.
4,058,839 A 11/1977 Darjany
4,453,074 A 6/1984 Weinstein
4,454,414 A 6/1984 Benton
4,465,206 A 8/1984 Sorel et al.
4,473,825 A 9/1984 Walton
4,501,958 A 2/1985 Glize et al.
4,523,297 A 6/1985 Ugon et al.
4,544,834 A 10/1985 Newport et al.
4,545,838 A 10/1985 Minkus et al.
4,575,621 A 3/1986 Dreifus
4,582,985 A 4/1986 Lofberg
4,587,379 A 5/1986 Masuda
4,605,844 A 8/1986 Haggan
4,614,861 A 9/1986 Pavlov et al.
4,634,845 A 1/1987 Hale et al.
4,650,981 A 3/1987 Foletta
4,654,658 A 3/1987 Walton
4,669,730 A 6/1987 Small
4,689,478 A 8/1987 Hale et al.
4,697,072 A 9/1987 Kawana
4,700,055 A 10/1987 Kashkashian, Jr.
4,701,601 A 10/1987 Francini et al.
4,722,054 A 1/1988 Yorozu et al.
4,727,243 A 2/1988 Savar
4,746,787 A 5/1988 Okada
4,747,620 A 5/1988 Kay et al.
4,750,036 A 6/1988 Martinez
4,750,119 A 6/1988 Robertson
4,752,676 A 6/1988 Leonard et al.
4,754,418 A 6/1988 Hara
4,766,293 A 8/1988 Boston
4,766,539 A 8/1988 Fox
4,775,784 A 10/1988 Stark
4,789,928 A 12/1988 Fujisaki
4,817,949 A 4/1989 Bachman et al.
4,822,985 A 4/1989 Boggan et al.
4,825,052 A 4/1989 Ugon
4,831,242 A 5/1989 Englehardt
4,831,526 A 5/1989 Luchs
4,831,647 A 5/1989 O'Avelio et al.
4,833,048 A 5/1989 Dejonghe et al.
4,845,347 A 7/1989 McCrindle
4,849,618 A 7/1989 Namikawa et al.
4,857,714 A 8/1989 Sunyich
4,859,837 A 8/1989 Halpern
4,868,376 A 9/1989 Lessin et al.
4,870,259 A 9/1989 Boggan et al.
4,876,441 A 10/1989 Hara et al.
4,882,675 A 11/1989 Nichtberger et al.
4,897,533 A 1/1990 Lyszczarz
4,899,036 A 2/1990 McCrindle et al.
4,906,826 A 3/1990 Spencer
4,908,521 A 3/1990 Boggan et al.
4,916,296 A 4/1990 Streck
4,922,111 A 5/1990 Kuwano
4,923,288 A 5/1990 Allen et al.
4,928,001 A 5/1990 Masada
4,941,090 A 7/1990 McCarthy
4,943,707 A 7/1990 Boggan
4,947,027 A 8/1990 Golightly
4,953,085 A 8/1990 Atkins
4,954,985 A 9/1990 Yamazaki
4,961,142 A 10/1990 Elliott et al.
4,968,873 A 11/1990 Dethloff et al.
4,975,840 A 12/1990 DeTore et al.
4,977,455 A 12/1990 Young
4,977,501 A 12/1990 Lefevre
4,978,401 A 12/1990 Bonomi
4,992,940 A 2/1991 Dworkin
4,999,617 A 3/1991 Uemura
5,025,139 A 6/1991 Halliburton, Jr.
5,025,372 A 6/1991 Burton et al.
5,025,373 A 6/1991 Keyser, Jr.
5,047,614 A 9/1991 Bianco
5,049,728 A 9/1991 Rovin
5,053,774 A 10/1991 Schuermann et al.
5,055,662 A 10/1991 Hasegawa
5,072,380 A 12/1991 Randelman et al.
5,080,748 A 1/1992 Bonomi
5,095,194 A 3/1992 Barbanell
5,097,115 A 3/1992 Ogasawara et al.
5,103,079 A 4/1992 Barakai et al.
5,107,100 A 4/1992 Shepard et al.
5,117,355 A 5/1992 McCarthy
5,122,950 A 6/1992 Mee
5,146,068 A 9/1992 Ugawa et al.
5,154,731 A 10/1992 Winger
5,162,175 A 11/1992 Visco et al.
5,163,086 A 11/1992 Ahearn et al.
5,168,151 A 12/1992 Nara
5,173,589 A 12/1992 Diehl
5,175,416 A 12/1992 Mansvelt
5,175,682 A 12/1992 Higashiyama
5,180,901 A 1/1993 Hiramatsu
5,191,193 A 3/1993 Le Roux
5,192,947 A 3/1993 Neustein
5,202,286 A 4/1993 Nakatani
5,202,826 A 4/1993 McCarthy
5,206,488 A 4/1993 Teicher
5,206,803 A 4/1993 Vitagliano
5,218,631 A 6/1993 Katz
5,220,593 A 6/1993 Zicker et al.
5,227,614 A 7/1993 Danielson
5,233,654 A 8/1993 Harvey et al.
5,237,620 A 8/1993 Deaton
5,241,161 A 8/1993 Zuta
5,247,190 A 9/1993 Friend et al.
5,249,044 A 9/1993 Von Kohorn
5,252,815 A 10/1993 Pernet
5,253,345 A 10/1993 Fernandes et al.
5,257,486 A 11/1993 Holmwall
5,276,311 A 1/1994 Hennige
5,285,278 A 2/1994 Holman
5,286,955 A 2/1994 Kloss
5,287,181 A 2/1994 Holman
5,287,268 A 2/1994 McCarthy
5,287,269 A 2/1994 Dorrough et al.
5,297,026 A 3/1994 Hoffman
5,299,940 A 4/1994 Uenaka et al.
5,311,594 A 5/1994 Penzias
5,317,137 A 5/1994 Wilkins
5,321,240 A 6/1994 Takahira
5,321,751 A 6/1994 Ray et al.
5,326,959 A 7/1994 Perazza
5,326,960 A 7/1994 Tannenbaum
5,328,809 A 7/1994 Holmes et al.
5,337,063 A 8/1994 Takahira
5,339,239 A 8/1994 Manabe et al.
5,340,969 A 8/1994 Cox
5,349,633 A 9/1994 Katz
5,350,906 A 9/1994 Brody et al.
5,351,187 A 9/1994 Hassett
5,352,877 A 10/1994 Morley
5,357,563 A 10/1994 Hamilton et al.
5,359,183 A 10/1994 Skodlar
5,365,575 A 11/1994 Katz
5,382,784 A 1/1995 Eberhardt
5,383,113 A 1/1995 Knight
5,396,558 A 3/1995 Ishiguro et al.
5,396,650 A 3/1995 Terauchi
5,397,881 A 3/1995 Mannik
5,399,502 A 3/1995 Friend et al.
5,401,827 A 3/1995 Holmes et al.
RE34,915 E 4/1995 Nichtberger et al.
5,412,192 A 5/1995 Hoss
5,413,341 A 5/1995 Lieberman
5,424,524 A 6/1995 Ruppert et al.
5,425,497 A 6/1995 Sorensen

(56) References Cited

U.S. PATENT DOCUMENTS 5,448,471 A 9/1995 Deaton et al.
5,449,894 A 9/1995 Bruhnke et al.
5,450,477 A 9/1995 Amarant et al.
5,450,479 A 9/1995 Alesio
5,451,763 A 9/1995 Pickett et al.
5,453,601 A 9/1995 Rosen
5,455,407 A 10/1995 Rosen
5,459,306 A 10/1995 Stein et al.
5,465,206 A 11/1995 Hilt et al.
5,466,919 A 11/1995 Hovakimian
5,466,920 A 11/1995 Nair et al.
5,471,669 A 11/1995 Lidman
5,477,038 A 12/1995 Levine et al.
5,477,040 A 12/1995 Lalonde
5,479,172 A 12/1995 Smith et al.
5,479,494 A 12/1995 Clitherow
5,481,094 A 1/1996 Suda
5,482,139 A 1/1996 Rivalto
5,483,444 A 1/1996 Malark
5,483,445 A 1/1996 Pickering
5,484,997 A 1/1996 Haynes
5,488,571 A 1/1996 Jacobs
5,492,370 A 2/1996 Chatwin et al.
5,495,250 A 2/1996 Ghaem et al.
5,495,981 A 3/1996 Warther
5,500,514 A 3/1996 Veeneman et al.
5,500,890 A 3/1996 Rogge et al.
5,504,321 A 4/1996 Sheldon
5,504,664 A 4/1996 Ostema
5,506,394 A 4/1996 Plesko
5,508,731 A 4/1996 Kohorn
5,510,828 A 4/1996 Lutterbach
5,511,114 A 4/1996 Stimson et al.
5,512,654 A 4/1996 Holmes et al.
5,513,102 A 4/1996 Auriemma
5,516,598 A 5/1996 Visco et al.
5,521,363 A 5/1996 Tannenbaum
5,523,179 A 6/1996 Chu
5,523,794 A 6/1996 Mankovitz
5,528,222 A 6/1996 Moskowitz et al.
5,530,232 A 6/1996 Taylor
5,530,235 A 6/1996 Stefik et al.
5,532,689 A 7/1996 Bueno
5,535,147 A 7/1996 Jacobs
5,537,314 A 7/1996 Kanter
5,541,583 A 7/1996 Mandelbaum
5,544,086 A 8/1996 Davis et al.
5,544,246 A 8/1996 Mandelbaum et al.
5,550,734 A 8/1996 Tater
5,552,790 A 9/1996 Gunnarsson
5,553,120 A 9/1996 Katz
5,557,087 A 9/1996 Duyck
5,559,313 A 9/1996 Claus et al.
5,559,315 A 9/1996 Nair et al.
5,563,948 A 10/1996 Diehl
5,566,441 A * 10/1996 Marsh et al. .................... 29/600
5,568,441 A 10/1996 Sanemitsu
5,569,898 A 10/1996 Fisher et al.
5,572,004 A 11/1996 Raimann
5,577,109 A 11/1996 Stimson et al.
5,578,808 A 11/1996 Taylor
5,581,064 A 12/1996 Riley et al.
5,581,257 A 12/1996 Greene et al.
5,582,623 A 12/1996 Chu
5,585,787 A 12/1996 Wallerstein
5,590,038 A 12/1996 Pitroda
5,592,560 A 1/1997 Deaton et al.
5,594,493 A 1/1997 Nemirofsky
5,595,356 A 1/1997 Kewin
5,602,919 A 2/1997 Hurta et al.
5,604,542 A 2/1997 Dedrick
5,608,785 A 3/1997 Kasday
5,612,868 A 3/1997 Off
5,613,095 A 3/1997 Moss et al.
5,617,474 A 4/1997 Ditzig et al.
5,619,558 A 4/1997 Jheeta
5,621,787 A 4/1997 McKoy et al.
5,621,812 A 4/1997 Deaton et al.
5,629,977 A 5/1997 Fonseca
5,637,845 A 6/1997 Kolls
5,638,457 A 6/1997 Deaton et al.
5,640,002 A 6/1997 Ruppert et al.
5,642,279 A 6/1997 Bloomberg et al.
5,642,485 A 6/1997 Deaton et al.
5,644,723 A 7/1997 Deaton et al.
5,644,727 A 7/1997 Atkins
5,648,647 A 7/1997 Seiler
5,649,114 A 7/1997 Deaton et al.
5,649,117 A 7/1997 Landry
5,649,118 A 7/1997 Carlisle et al.
5,652,602 A 7/1997 Fishman
5,652,786 A 7/1997 Rogers
5,653,914 A 8/1997 Holmes et al.
5,659,469 A 8/1997 Deaton et al.
5,659,741 A 8/1997 Eberhardt
5,663,766 A 9/1997 Sizer, II
5,664,110 A 9/1997 Green et al.
5,664,157 A 9/1997 Takahira et al.
5,665,953 A 9/1997 Mazzamuto
5,672,678 A 9/1997 Holmes et al.
5,675,607 A 10/1997 Alesio et al.
5,675,662 A 10/1997 Deaton et al.
5,677,521 A 10/1997 Garrou
5,677,955 A 10/1997 Doggett et al.
5,680,459 A 10/1997 Hook et al.
5,684,291 A 11/1997 Taskett
5,687,322 A 11/1997 Deaton et al.
5,689,100 A 11/1997 Carrithers et al.
5,689,650 A 11/1997 McClelland et al.
5,690,412 A 11/1997 Sheldon
5,692,132 A 11/1997 Hogan
5,696,824 A 12/1997 Walsh
5,696,907 A 12/1997 Tom
5,698,837 A 12/1997 Furuta
5,699,528 A 12/1997 Hogan
5,703,344 A 12/1997 Bezy et al.
5,703,755 A 12/1997 Flesher et al.
5,704,044 A 12/1997 Tarter et al.
5,704,046 A 12/1997 Hogan
5,705,798 A 1/1998 Tarbox
5,708,422 A 1/1998 Blonder et al.
5,710,458 A 1/1998 Iwasaki
5,710,886 A 1/1998 Christensen et al.
5,710,887 A 1/1998 Chelliah
5,710,889 A 1/1998 Clark et al.
5,715,298 A 2/1998 Rogers
5,715,399 A 2/1998 Bezos
5,717,925 A 2/1998 Harper et al.
5,721,768 A 2/1998 Stimson et al.
5,721,781 A 2/1998 Deo et al.
5,726,884 A 3/1998 Sturgeon et al.
5,727,153 A 3/1998 Powell
5,728,998 A 3/1998 Novis et al.
5,729,693 A 3/1998 Holda-Fleck
5,732,346 A 3/1998 Lazardis et al.
5,734,154 A 3/1998 Jachimowicz et al.
5,734,838 A 3/1998 Robinson
5,736,727 A 4/1998 Nakata
5,736,728 A 4/1998 Matsubara
5,737,421 A 4/1998 Audebert
5,740,549 A 4/1998 Reilly et al.
5,742,775 A 4/1998 King
5,744,789 A 4/1998 Kashi
5,745,049 A 4/1998 Akiyama et al.
5,745,706 A 4/1998 Wolfberg et al.
5,747,784 A 5/1998 Walter et al.
5,749,075 A 5/1998 Toader et al.
5,751,953 A 5/1998 Sheils
5,760,381 A 6/1998 Stich et al.
5,761,624 A 6/1998 Mooney
5,763,862 A 6/1998 Jachimowicz
5,763,867 A 6/1998 Main et al.
5,765,138 A 6/1998 Aycock et al.
5,765,141 A 6/1998 Spector

(56) References Cited

U.S. PATENT DOCUMENTS 5,767,896 A 6/1998 Nemirofsky
5,770,843 A 6/1998 Rose et al.
5,770,849 A 6/1998 Novis et al.
5,774,870 A 6/1998 Storey
5,777,305 A 7/1998 Smith et al.
5,777,306 A 7/1998 Masuda
5,777,903 A 7/1998 Piosenka et al.
5,778,067 A 7/1998 Jones et al.
5,787,156 A 7/1998 Katz
5,787,404 A 7/1998 Fernandez-Holmann
5,789,732 A 8/1998 McMahon et al.
5,789,733 A 8/1998 Jachimowicz et al.
5,793,502 A 8/1998 Bianco et al.
5,794,207 A 8/1998 Walker
5,796,827 A 8/1998 Coppersmith et al.
5,799,087 A 8/1998 Rosen
5,802,176 A 9/1998 Audebert
5,804,806 A 9/1998 Haddad
5,805,719 A 9/1998 Pare et al.
5,806,042 A 9/1998 Kelly et al.
5,806,044 A 9/1998 Powell
5,806,045 A 9/1998 Biorge
5,807,627 A 9/1998 Friend et al.
5,809,478 A 9/1998 Greco
5,815,127 A 9/1998 Jacobs
5,815,657 A 9/1998 Williams et al.
5,815,658 A 9/1998 Kuriyama
5,817,207 A 10/1998 Leighton
5,818,030 A 10/1998 Reyes
5,819,234 A 10/1998 Slavin
5,819,237 A 10/1998 Garman
5,828,044 A 10/1998 Jun et al.
5,832,090 A 11/1998 Raspotnik
5,832,457 A 11/1998 O'Brien
5,832,488 A 11/1998 Eberhardt
5,835,061 A 11/1998 Stewart
5,835,576 A 11/1998 Katz
5,839,113 A 11/1998 Federau et al.
5,844,230 A 12/1998 Lalonde
5,845,256 A 12/1998 Pescitelli et al.
5,845,259 A 12/1998 West et al.
5,845,260 A 12/1998 Nakano et al.
5,850,217 A 12/1998 Cole
5,852,811 A 12/1998 Atkins
5,852,812 A 12/1998 Reeder
5,853,498 A 12/1998 Beneking et al.
5,854,595 A 12/1998 Williams
5,857,079 A 1/1999 Claus et al.
5,857,175 A 1/1999 Day
5,857,709 A 1/1999 Chock
5,859,419 A 1/1999 Wynn
5,859,779 A 1/1999 Giordano et al.
5,864,609 A 1/1999 Cross et al.
5,864,828 A 1/1999 Atkins
5,864,830 A 1/1999 Armetta et al.
RE36,116 E 2/1999 McCarthy
5,870,155 A 2/1999 Erlin
5,870,456 A 2/1999 Rogers
5,870,718 A 2/1999 Spector
5,870,721 A 2/1999 Norris
5,875,437 A 2/1999 Atkins
5,877,941 A 3/1999 Ryu
5,878,141 A 3/1999 Daly et al.
5,880,452 A 3/1999 Plesko
5,880,769 A 3/1999 Nemirofsky
5,882,812 A 3/1999 Visco et al.
5,883,377 A 3/1999 Chapin, Jr.
5,883,810 A 3/1999 Franklin et al.
5,884,271 A 3/1999 Pitroda
5,884,278 A 3/1999 Powell
5,884,285 A 3/1999 Atkins
5,887,065 A 3/1999 Audebert
5,887,271 A 3/1999 Powell
5,889,268 A 3/1999 Swartz
5,890,135 A 3/1999 Powell
5,890,138 A 3/1999 Godin et al.
5,890,140 A 3/1999 Clark et al.
H1794 H 4/1999 Claus
5,897,620 A 4/1999 Walker et al.
5,905,246 A 5/1999 Fajkowski
5,907,142 A 5/1999 Kelsey
5,911,135 A 6/1999 Atkins
5,911,136 A 6/1999 Atkins
5,914,472 A 6/1999 Foladare et al.
5,920,177 A 7/1999 Davis
5,920,629 A 7/1999 Rosen
5,920,844 A 7/1999 Hotta et al.
5,920,847 A 7/1999 Kolling et al.
5,921,263 A 7/1999 Negley, III
5,923,734 A 7/1999 Taskett
5,923,735 A 7/1999 Swartz et al.
5,926,800 A 7/1999 Baronowski et al.
5,928,082 A 7/1999 Clapper, Jr.
5,928,336 A 7/1999 Takeuchi
5,928,439 A 7/1999 Ota et al.
5,930,217 A 7/1999 Kayanuma
5,931,764 A 8/1999 Freeman et al.
5,932,994 A 8/1999 Jo et al.
5,933,817 A 8/1999 Hucal
5,937,068 A 8/1999 Audebert
5,940,811 A 8/1999 Norris
5,949,044 A 9/1999 Walker et al.
5,952,639 A 9/1999 Ohki
5,952,641 A 9/1999 Korshun
5,952,642 A 9/1999 Lutz
5,953,423 A 9/1999 Rosen
5,953,710 A 9/1999 Fleming
5,955,961 A 9/1999 Wallerstein
RE36,356 E 10/1999 Gloton et al.
5,962,837 A 10/1999 Main et al.
5,963,648 A 10/1999 Rosen
5,967,264 A 10/1999 Lutz et al.
5,970,479 A 10/1999 Shepherd
5,970,480 A 10/1999 Kalina
5,973,756 A 10/1999 Erlin
5,974,399 A 10/1999 Giuliani et al.
RE36,365 E 11/1999 Levine et al.
5,978,774 A 11/1999 Rogers et al.
5,984,180 A 11/1999 Albrecht
5,984,191 A 11/1999 Chapin, Jr.
5,987,434 A 11/1999 Libman
5,988,503 A 11/1999 Kuo
5,988,509 A 11/1999 Taskett
5,991,410 A 11/1999 Albert et al.
5,991,413 A 11/1999 Arditti et al.
5,991,736 A 11/1999 Ferguson et al.
5,991,738 A 11/1999 Ogram
5,991,743 A 11/1999 Irving et al.
5,991,748 A 11/1999 Taskett
5,991,750 A 11/1999 Watson
5,995,372 A 11/1999 Asakura
5,999,596 A 12/1999 Walker et al.
6,000,608 A 12/1999 Dorf
6,000,832 A 12/1999 Franklin et al.
6,002,383 A 12/1999 Shimada
6,003,008 A 12/1999 Postrel et al.
6,003,762 A 12/1999 Hayashida
6,003,770 A 12/1999 Schilling
6,004,681 A 12/1999 Epstein et al.
6,005,183 A 12/1999 Akai et al.
6,006,205 A 12/1999 Loeb et al.
6,006,775 A 12/1999 Negley
6,006,988 A 12/1999 Behrmann et al.
6,009,415 A 12/1999 Shurling et al.
6,011,858 A 1/2000 Stock et al.
6,014,133 A 1/2000 Yamakado et al.
6,014,636 A 1/2000 Reeder
6,014,638 A 1/2000 Burge et al.
6,014,645 A 1/2000 Cunningham
6,014,749 A 1/2000 Gloor et al.
6,016,298 A 1/2000 Fischer
6,016,476 A 1/2000 Maes et al.
6,016,482 A 1/2000 Molinari et al.
6,016,954 A 1/2000 Abe et al.

(56) References Cited

U.S. PATENT DOCUMENTS 6,018,718 A 1/2000 Walker et al.
6,019,284 A 2/2000 Freeman et al.
6,023,682 A 2/2000 Checchio
6,025,283 A 2/2000 Roberts
6,026,370 A 2/2000 Jermyn
6,027,028 A 2/2000 Pieterse et al.
6,029,139 A 2/2000 Cunningham et al.
6,029,890 A 2/2000 Austin
6,030,720 A 2/2000 Chu et al.
6,032,136 A 2/2000 Brake, Jr. et al.
6,036,099 A 3/2000 Leighton
6,038,292 A 3/2000 Thomas
6,038,552 A 3/2000 Fleischl et al.
6,041,315 A 3/2000 Pollin
6,041,965 A 3/2000 Smith
6,045,042 A 4/2000 Ohno
6,047,067 A 4/2000 Rosen
6,047,268 A 4/2000 Bartoli et al.
6,048,271 A 4/2000 Barcelou
6,049,463 A 4/2000 O'Malley et al.
6,049,773 A 4/2000 McCormack et al.
6,049,782 A 4/2000 Gottesman et al.
6,056,199 A 5/2000 Wiklof et al.
6,058,378 A 5/2000 Clark et al.
6,064,985 A 5/2000 Anderson
6,064,988 A 5/2000 Thomas
6,065,675 A 5/2000 Teicher
6,068,183 A 5/2000 Freeman et al.
6,070,067 A 5/2000 Nguyen et al.
6,070,147 A 5/2000 Harms et al.
6,070,153 A 5/2000 Simpson
6,073,840 A 6/2000 Marion
6,076,068 A 6/2000 DeLapa et al.
6,076,072 A 6/2000 Libman
6,078,888 A 6/2000 Johnson, Jr.
6,078,891 A 6/2000 Riordan et al.
6,087,954 A 7/2000 McSpadden et al.
6,089,284 A 7/2000 Kaehler et al.
6,089,456 A 7/2000 Walsh et al.
6,091,817 A 7/2000 Bertina et al.
6,092,056 A 7/2000 Tull, Jr. et al.
6,092,057 A 7/2000 Zimmerman et al.
6,092,669 A 7/2000 Kushiya et al.
6,095,072 A 8/2000 Kaufhold
6,095,412 A 8/2000 Bertina et al.
6,095,416 A 8/2000 Grant et al.
6,098,053 A 8/2000 Slater
6,101,477 A 8/2000 Hohle et al.
6,105,011 A 8/2000 Morrison, Jr.
6,105,865 A 8/2000 Hardesty
6,105,866 A 8/2000 Morrison et al.
6,107,562 A 8/2000 Hashimoto et al.
D431,037 S 9/2000 Wilson
D431,039 S 9/2000 Wilson
D431,252 S 9/2000 Wilson
6,115,458 A 9/2000 Taskett
6,116,505 A 9/2000 Withrow
6,119,932 A 9/2000 Maloney et al.
6,121,069 A 9/2000 Boyko et al.
6,122,623 A 9/2000 Garman
6,124,545 A 9/2000 Bauer et al.
D431,573 S 10/2000 Wilson
D432,141 S 10/2000 Wilson
D432,548 S 10/2000 Wilson
D432,552 S 10/2000 Wilson
D433,031 S 10/2000 Wilson
D433,032 S 10/2000 Wilson
D433,033 S 10/2000 Wilson
D433,034 S 10/2000 Wilson
D433,035 S 10/2000 Wilson
D433,036 S 10/2000 Wilson
D433,037 S 10/2000 Wilson
D433,059 S 10/2000 Okumura et al.
6,128,598 A 10/2000 Walker et al.
6,128,599 A 10/2000 Walker et al.
6,129,274 A 10/2000 Suzuki
6,130,623 A 10/2000 MacLellan et al.
6,134,536 A 10/2000 Shepherd
6,138,917 A 10/2000 Chapin, Jr.
D433,420 S 11/2000 Wilson
D433,421 S 11/2000 Wilson
D433,422 S 11/2000 Wilson
D433,423 S 11/2000 Wilson
D433,424 S 11/2000 Wilson
D434,041 S 11/2000 Burke
6,144,848 A 11/2000 Walsh et al.
6,145,741 A 11/2000 Wisdom et al.
6,148,297 A 11/2000 Swor et al.
6,150,921 A 11/2000 Werb et al.
6,156,967 A 12/2000 Ralph et al.
6,156,968 A 12/2000 Nishimoto et al.
6,157,824 A 12/2000 Bailey
6,161,096 A 12/2000 Bell
6,163,770 A 12/2000 Gamble et al.
6,164,533 A 12/2000 Barton
6,164,548 A 12/2000 Curiel
6,166,638 A 12/2000 Brady et al.
6,167,385 A 12/2000 Hartley-Urquhart
6,169,975 B1 1/2001 White et al.
6,170,745 B1 1/2001 Schilling
6,173,267 B1 1/2001 Cairns
6,182,048 B1 1/2001 Osborn et al.
D437,882 S 2/2001 Creighton
6,182,894 B1 2/2001 Hackett et al.
6,186,793 B1 2/2001 Brubaker
6,188,309 B1 2/2001 Levine
6,189,787 B1 2/2001 Dorf
6,193,156 B1 2/2001 Han et al.
6,195,644 B1 2/2001 Bowie
6,202,053 B1 3/2001 Christiansen et al.
6,206,292 B1 * 3/2001 Robertz et al. ................ 235/488
RE37,122 E 4/2001 Levine et al.
6,213,395 B1 4/2001 Dejaeger et al.
6,214,155 B1 4/2001 Leighton
6,222,914 B1 4/2001 McMullin
6,227,447 B1 5/2001 Campisano
6,230,970 B1 5/2001 Walsh et al.
6,243,688 B1 6/2001 Kalina
6,250,555 B1 6/2001 Inamoto
6,260,024 B1 7/2001 Shkedy
6,263,316 B1 7/2001 Khan et al.
6,264,106 B1 7/2001 Bridgelall
6,265,977 B1 7/2001 Vega et al.
6,267,292 B1 7/2001 Walker et al.
6,275,681 B1 8/2001 Vega et al.
6,275,991 B1 8/2001 Enin
6,278,369 B2 8/2001 Smith et al.
6,278,981 B1 8/2001 Dembo et al.
6,292,786 B1 9/2001 Deaton et al.
6,294,241 B1 9/2001 Kaule et al.
6,295,522 B1 9/2001 Boesch
6,298,336 B1 10/2001 Davis et al.
6,305,607 B1 10/2001 Katz et al.
6,308,268 B1 10/2001 Audebert
6,308,542 B1 10/2001 Bolton
6,308,887 B1 10/2001 Korman et al.
6,315,195 B1 11/2001 Ramachandran
6,317,721 B1 11/2001 Hurta
6,318,536 B1 11/2001 Korman
6,318,636 B1 11/2001 Reynolds et al.
6,324,524 B1 11/2001 Lent et al.
6,327,573 B1 12/2001 Walker et al.
6,327,575 B1 12/2001 Katz
6,328,342 B1 12/2001 Belousov et al.
6,329,920 B1 12/2001 Morrison et al.
6,330,543 B1 12/2001 Kepecs
6,332,133 B1 * 12/2001 Takayama ...................... 705/39
6,334,216 B1 12/2001 Barth
6,336,099 B1 1/2002 Barnett et al.
6,337,752 B1 1/2002 Heckenkamp et al.
6,341,724 B2 1/2002 Campisano
6,343,743 B1 2/2002 Lamla
6,345,261 B1 2/2002 Feidelson
6,345,766 B1 2/2002 Taskett et al.

(56) References Cited

U.S. PATENT DOCUMENTS 6,349,291 B1 2/2002 Varma
6,349,972 B1 2/2002 Geiger et al.
6,354,498 B1 3/2002 Lutz
6,360,138 B1 3/2002 Coppola et al.
6,360,954 B1 3/2002 Barnardo
6,363,355 B1 3/2002 Morrison et al.
6,366,220 B1 4/2002 Elliott
6,371,375 B1 4/2002 Ackley et al.
6,373,969 B1 4/2002 Adler
6,377,669 B1 4/2002 Walker et al.
6,382,506 B1 5/2002 Van Der Valk
6,385,591 B1 5/2002 Mankoff
6,386,444 B1 5/2002 Sullivan
6,397,202 B1 5/2002 Higgins et al.
6,402,039 B1 6/2002 Freeman et al.
6,405,181 B2 6/2002 Lent et al.
6,405,182 B1 6/2002 Cuervo
6,409,593 B1 6/2002 Petrecca
6,415,978 B1 7/2002 McAllister
6,422,459 B1 7/2002 Kawan
6,422,462 B1 7/2002 Cohen
6,424,029 B1 7/2002 Giesler
6,424,884 B1 7/2002 Brooke et al.
6,424,949 B1 7/2002 Deaton et al.
6,425,524 B2 7/2002 Pentel
6,427,911 B1 8/2002 Barnes et al.
6,429,927 B1 8/2002 Borza
6,434,259 B1 8/2002 Hamid et al.
6,441,736 B1 8/2002 Leighton
6,446,210 B1 9/2002 Borza
6,450,407 B1 9/2002 Freeman et al.
6,454,647 B1 9/2002 Woodbury, Jr.
6,456,981 B1 9/2002 Dejaeger et al.
6,463,039 B1 10/2002 Ricci et al.
6,467,684 B2 10/2002 Fite et al.
6,470,233 B1 10/2002 Johnson, Jr.
6,471,128 B1 10/2002 Corcoran et al.
6,473,500 B1 10/2002 Risafi et al.
6,482,330 B1 11/2002 Bajorek
6,483,427 B1 11/2002 Werb
6,484,144 B2 11/2002 Martin et al.
6,484,148 B1 11/2002 Boyd
6,491,229 B1 12/2002 Berney
6,492,717 B1 12/2002 Gore et al.
6,494,367 B1 12/2002 Zacharias
6,498,861 B1 12/2002 Hamid et al.
6,505,168 B1 1/2003 Rothman et al.
6,514,367 B1 2/2003 Leighton
6,529,880 B1 * 3/2003 McKeen et al. ................. 705/17
6,533,180 B1 3/2003 Wood
6,535,726 B1 3/2003 Johnson
6,549,912 B1 4/2003 Chen
6,557,766 B1 5/2003 Leighton
6,560,578 B2 5/2003 Eldering
6,560,581 B1 5/2003 Fox et al.
6,567,791 B2 5/2003 Lent et al.
6,574,603 B1 6/2003 Dickson et al.
6,581,839 B1 6/2003 Lasch et al.
6,584,309 B1 6/2003 Whigham
6,601,761 B1 8/2003 Katis
6,607,127 B2 8/2003 Wong
6,608,551 B1 * 8/2003 Anderson et al. .......... 340/10.51
6,609,111 B1 8/2003 Bell
6,609,658 B1 8/2003 Sehr
6,611,673 B1 * 8/2003 Bayley et al. ................. 455/564
RE38,255 E 9/2003 Levine et al.
6,615,189 B1 9/2003 Phillips et al.
6,615,190 B1 9/2003 Slater
6,615,194 B1 9/2003 Deutsch et al.
6,625,582 B2 9/2003 Richman et al.
D481,068 S 10/2003 Blossom et al.
6,631,849 B2 10/2003 Blossom
6,641,049 B2 11/2003 Luu
6,641,050 B2 11/2003 Kelley et al.
6,644,551 B2 11/2003 Clayman et al.
6,672,512 B2 1/2004 Bridgelall
6,675,127 B2 1/2004 LaBlanc et al.
6,687,714 B1 2/2004 Kogen et al.
6,693,544 B1 2/2004 Hebbecker
6,702,181 B2 3/2004 Ramachandran
6,715,797 B2 4/2004 Curiel
6,725,303 B1 4/2004 Hoguta et al.
6,734,887 B2 5/2004 Field
D490,840 S 6/2004 Arakaki et al.
D491,186 S 6/2004 Arakaki et al.
D491,953 S 6/2004 Arakaki et al.
6,742,704 B2 6/2004 Fitzmaurice et al.
6,745,938 B2 6/2004 Sullivan
6,749,122 B1 6/2004 Koenck et al.
6,749,123 B2 6/2004 Lasch et al.
6,761,316 B2 7/2004 Bridgelall et al.
6,764,014 B2 7/2004 Lasch et al.
6,769,607 B1 8/2004 Pitroda et al.
D496,365 S 9/2004 Liu et al.
6,796,490 B1 9/2004 Drummond et al.
6,802,008 B1 10/2004 Ikefuji et al.
6,805,287 B2 10/2004 Bishop
6,809,952 B2 10/2004 Masui
6,810,304 B1 * 10/2004 Dickson ........................ 700/241
D498,236 S 11/2004 Liu et al.
6,811,088 B2 11/2004 Lanzaro et al.
6,811,862 B2 11/2004 Yoshihara et al.
6,830,181 B1 12/2004 Bennett
6,865,547 B1 3/2005 Brake, Jr. et al.
6,868,426 B1 3/2005 Mankoff
6,876,971 B1 4/2005 Burke
6,895,391 B1 5/2005 Kausik
6,901,372 B1 5/2005 Helzerman
6,925,439 B1 8/2005 Pitroda
6,942,569 B2 9/2005 Petrecca
6,957,334 B1 10/2005 Goldstein
6,961,710 B1 11/2005 Yanagisawa et al.
6,965,868 B1 11/2005 Bednarek
6,970,583 B2 11/2005 Black
6,970,830 B1 11/2005 Samra et al.
6,991,157 B2 1/2006 Bishop et al.
6,998,397 B2 2/2006 Khripach et al.
7,005,985 B1 * 2/2006 Steeves ...................... 340/572.1
7,006,992 B1 2/2006 Packwood
7,014,110 B2 3/2006 Minowa et al.
7,025,256 B1 4/2006 Drummond et al.
7,039,600 B1 5/2006 Meek et al.
7,040,533 B1 5/2006 Ramachandran
7,059,531 B2 6/2006 Beenau et al.
7,070,112 B2 7/2006 Beenau et al.
7,072,864 B2 7/2006 Brake, Jr. et al.
7,086,584 B2 8/2006 Stoutenburg et al.
7,089,208 B1 8/2006 Levchin et al.
7,090,138 B2 8/2006 Rettenmyer et al.
7,093,767 B2 8/2006 Faenza et al.
7,096,003 B2 8/2006 Joao et al.
7,106,843 B1 9/2006 Gainsboro
7,119,659 B2 10/2006 Bonalle et al.
7,121,471 B2 10/2006 Beenau et al.
7,131,574 B1 11/2006 Sciupac et al.
7,150,393 B1 12/2006 Drummond et al.
7,154,375 B2 12/2006 Beenau et al.
7,156,301 B1 1/2007 Bonalle et al.
7,228,155 B2 6/2007 Saunders
7,249,097 B2 7/2007 Hutchison et al.
7,249,099 B2 7/2007 Ling
7,249,112 B2 7/2007 Berardi et al.
7,308,426 B1 * 12/2007 Pitroda ........................... 705/35
7,312,707 B1 12/2007 Bishop et al.
7,328,189 B2 2/2008 Ling
7,333,948 B2 2/2008 Bell et al.
7,340,439 B2 3/2008 Burger et al.
7,349,866 B2 3/2008 Schwarz, Jr.
7,376,583 B1 5/2008 Rolf
7,493,288 B2 2/2009 Biship et al.
7,526,449 B1 4/2009 Blossom
7,543,156 B2 6/2009 Campisi
7,545,960 B2 6/2009 Coutts
7,571,142 B1 8/2009 Flitcroft et al.

(56) References Cited

U.S. PATENT DOCUMENTS 7,580,857 B2 8/2009 VanFleet et al.
7,593,875 B2 9/2009 Granite et al.
D602,986 S 10/2009 Skelding et al.
7,600,675 B2 10/2009 Petralia et al.
7,630,935 B2 12/2009 Loeger et al.
7,729,925 B2 6/2010 Maritzen et al.
7,729,980 B2 6/2010 Mittenzwei et al.
7,778,876 B2 8/2010 Gravelle et al.
2001/0011243 A1 8/2001 Dembo et al.
2001/0011247 A1 8/2001 O'Flaherty et al.
2001/0011250 A1 8/2001 Paltenghe et al.
2001/0027441 A1 10/2001 Wankmueller
2001/0034663 A1 10/2001 Teveler et al.
2001/0034682 A1 10/2001 Knight et al.
2001/0037315 A1 11/2001 Saliba et al.
2001/0038033 A1 11/2001 Habib
2001/0039533 A1 11/2001 Pare et al.
2001/0044293 A1 11/2001 Morgan
2001/0047342 A1 11/2001 Cuervo
2001/0054003 A1 12/2001 Chien et al.
2001/0055411 A1 12/2001 Black
2001/0056398 A1 12/2001 Scheirer
2002/0007313 A1 1/2002 Mai et al.
2002/0008145 A1 1/2002 Walsh et al.
2002/0019803 A1 2/2002 Muller
2002/0022143 A1 2/2002 Ludwig et al.
2002/0026418 A1 2/2002 Koppel et al.
2002/0046255 A1 4/2002 Moore et al.
2002/0062235 A1 5/2002 Wahlbin et al.
2002/0077978 A1 6/2002 O'Leary et al.
2002/0091572 A1 7/2002 Anderson et al.
2002/0091631 A1 7/2002 Usui
2002/0095365 A1 7/2002 Slavin et al.
2002/0104878 A1 8/2002 Seifert et al.
2002/0116271 A1 8/2002 Mankoff
2002/0116330 A1 8/2002 Hed et al.
2002/0120627 A1 8/2002 Mankoff
2002/0120642 A1 8/2002 Fetherston
2002/0133461 A1 9/2002 Ramachandran
2002/0139858 A1 10/2002 Bridgelall et al.
2002/0143703 A1 10/2002 Razvan et al.
2002/0145039 A1 10/2002 Carroll
2002/0147662 A1 10/2002 Anderson
2002/0162893 A1 11/2002 Hikita et al.
2002/0165820 A1 11/2002 Anvekar et al.
2002/0167890 A2 11/2002 Duroj
2002/0174016 A1 11/2002 Cuervo
2002/0178063 A1 11/2002 Gravelle et al.
2002/0178369 A1 11/2002 Black
2003/0004828 A1 1/2003 Epstein
2003/0005310 A1 1/2003 Shinzaki
2003/0009382 A1 1/2003 D'Arbeloff et al.
2003/0023549 A1 1/2003 Armes et al.
2003/0024995 A1 2/2003 Conner et al.
2003/0028518 A1 2/2003 Mankoff
2003/0033211 A1 2/2003 Haines et al.
2003/0033246 A1 2/2003 Slater
2003/0040927 A1 2/2003 Sato et al.
2003/0040959 A1 2/2003 Fei et al.
2003/0046249 A1 3/2003 Wu
2003/0047253 A1 3/2003 Robinson et al.
2003/0053609 A1 3/2003 Risafi et al.
2003/0066895 A1 4/2003 Hikita et al.
2003/0075610 A1 4/2003 Ong
2003/0101119 A1 5/2003 Parsons et al.
2003/0105672 A1 6/2003 Epstein et al.
2003/0132301 A1 7/2003 Selker
2003/0135462 A1 7/2003 Brake, Jr. et al.
2003/0140004 A1 7/2003 O'Leary et al.
2003/0144935 A1 7/2003 Sobek
2003/0154125 A1 8/2003 Mittal et al.
2003/0163403 A1 8/2003 Chen et al.
2003/0163416 A1 8/2003 Kitajima
2003/0167207 A1 9/2003 Berardi et al.
2003/0172040 A1 9/2003 Kemper et al.
2003/0183689 A1 10/2003 Swift et al.
2003/0187787 A1 10/2003 Freund
2003/0195808 A1 10/2003 Brown et al.
2003/0200143 A9 10/2003 Walker et al.
2003/0200180 A1 10/2003 Phelan et al.
2003/0202151 A1 10/2003 Hinata
2003/0213843 A1 11/2003 Jackson
2003/0216965 A1 11/2003 Libman
2003/0217005 A1 11/2003 Drummond et al.
2003/0217329 A1 11/2003 Good
2003/0218066 A1 11/2003 Fernandes et al.
2003/0220876 A1 11/2003 Burger et al.
2003/0230631 A1 12/2003 Tsunoda et al.
2004/0010449 A1 1/2004 Berardi et al.
2004/0024672 A1 2/2004 Brake, Jr. et al.
2004/0029569 A1 2/2004 Khan et al.
2004/0030626 A1 2/2004 Libman
2004/0039588 A1 2/2004 Libman
2004/0078328 A1 4/2004 Talbert et al.
2004/0094624 A1 5/2004 Fernandes et al.
2004/0098351 A1 5/2004 Duke
2004/0117514 A1 6/2004 Nelms et al.
2004/0118930 A1 6/2004 Berardi et al.
2004/0124248 A1 7/2004 Selker
2004/0133787 A1 7/2004 Doughty et al.
2004/0149544 A1 8/2004 Dal Ferro
2004/0159700 A1 8/2004 Khan et al.
2004/0159708 A1 8/2004 Yogev et al.
2004/0159709 A1 8/2004 Ohta et al.
2004/0169088 A1 9/2004 Nelms et al.
2004/0182936 A1 9/2004 Koenck et al.
2004/0199474 A1 10/2004 Ritter
2004/0210498 A1 10/2004 Freund
2004/0230488 A1 11/2004 Beenau et al.
2004/0230536 A1 11/2004 Fung et al.
2004/0232220 A1 11/2004 Beenau et al.
2004/0232221 A1 11/2004 Beenau et al.
2004/0232222 A1 11/2004 Beenau et al.
2004/0232223 A1 11/2004 Beenau et al.
2004/0232224 A1 11/2004 Beenau et al.
2004/0233037 A1 11/2004 Beenau et al.
2004/0233038 A1 11/2004 Beenau et al.
2004/0233039 A1 11/2004 Beenau et al.
2004/0236688 A1 11/2004 Bozeman
2004/0236699 A1 11/2004 Beenau et al.
2004/0236700 A1 11/2004 Beenau et al.
2004/0236701 A1 11/2004 Beenau et al.
2004/0238621 A1 12/2004 Beenau et al.
2004/0239480 A1 12/2004 Beenau et al.
2004/0239481 A1 12/2004 Beenau
2004/0242308 A1 12/2004 Gray
2004/0243468 A1 12/2004 Cohagan et al.
2004/0243498 A1 12/2004 Duke
2004/0249710 A1 12/2004 Smith et al.
2004/0249712 A1 12/2004 Brown et al.
2004/0249839 A1 12/2004 Beenau et al.
2004/0252012 A1 12/2004 Beenau et al.
2004/0256469 A1 12/2004 Faenza, Jr. et al.
2004/0257197 A1 12/2004 Beenau et al.
2004/0260646 A1 12/2004 Berardi et al.
2005/0004839 A1 1/2005 Bakker et al.
2005/0004866 A1 1/2005 Bonalle et al.
2005/0006481 A1 1/2005 Han et al.
2005/0021400 A1 1/2005 Postrel
2005/0021405 A1 1/2005 Agarwal
2005/0021457 A1 1/2005 Johnson et al.
2005/0023346 A1 2/2005 Bakker et al.
2005/0023359 A1 2/2005 Saunders
2005/0027649 A1 2/2005 Cech
2005/0033619 A1 2/2005 Barnes et al.
2005/0033637 A1 2/2005 Underwood
2005/0033686 A1 2/2005 Peart et al.
2005/0033687 A1 2/2005 Beenau
2005/0033688 A1 2/2005 Peart et al.
2005/0033689 A1 2/2005 Bonalle et al.
2005/0035847 A1 2/2005 Bonalle et al.
2005/0038718 A1 2/2005 Barnes et al.
2005/0038736 A1 2/2005 Saunders
2005/0038741 A1 2/2005 Bonalle et al.

(56) References Cited

U.S. PATENT DOCUMENTS

2005/0040242 A1 2/2005 Beenau et al.
2005/0049965 A1 3/2005 Jen
2005/0050367 A1 3/2005 Burger et al.
2005/0055270 A1 3/2005 Broe
2005/0060233 A1 3/2005 Bonalle et al.
2005/0065877 A1 3/2005 Cleary et al.
2005/0071225 A1 3/2005 Bortolin et al.
2005/0071226 A1 3/2005 Nguyen et al.
2005/0071227 A1 3/2005 Hammad et al.
2005/0071230 A1 3/2005 Mankoff
2005/0071231 A1 3/2005 Beenau et al.
2005/0075889 A1 4/2005 Gomes et al.
2005/0075932 A1 4/2005 Mankoff
2005/0077349 A1 4/2005 Bonalle et al.
2005/0080672 A1 4/2005 Courtion et al.
2005/0086103 A1 4/2005 Agura et al.
2005/0091104 A1 4/2005 Abraham
2005/0091138 A1 4/2005 Awatsu
2005/0096976 A1 5/2005 Nelms
2005/0102178 A1 5/2005 Phillips et al.
2005/0108090 A1 5/2005 Takeda et al.
2005/0114883 A1 5/2005 Nagai et al.
2005/0116810 A1 6/2005 Beenau et al.
2005/0119938 A1 6/2005 Smith et al.
2005/0122209 A1 6/2005 Black
2005/0125292 A1 6/2005 Kassab et al.
2005/0131761 A1 6/2005 Trika et al.
2005/0131792 A1 6/2005 Rowe
2005/0144071 A1 6/2005 Monahan et al.
2005/0144074 A1 6/2005 Fredregill et al.
2005/0144105 A1 6/2005 Czyzewski
2005/0149386 A1 7/2005 Agura et al.
2005/0149393 A1 7/2005 Leof
2005/0160003 A1 7/2005 Berardi et al.
2005/0165695 A1 7/2005 Berardi et al.
2005/0167488 A1 8/2005 Higgins et al.
2005/0171839 A1 8/2005 Corriere
2005/0171842 A1 8/2005 Tien et al.
2005/0171898 A1 8/2005 Bishop et al.
2005/0177503 A1 8/2005 Thomas
2005/0179251 A1 8/2005 Wagoner et al.
2005/0187820 A1 8/2005 Mohan
2005/0189427 A1 9/2005 Brown et al.
2005/0192862 A1 9/2005 Modi
2005/0194453 A1 9/2005 Conner et al.
2005/0197904 A1 9/2005 Baron et al.
2005/0203824 A1 9/2005 Freud et al.
2005/0205666 A1 9/2005 Ward et al.
2005/0209917 A1 9/2005 Anderson et al.
2005/0216346 A1 9/2005 Kusumoto et al.
2005/0216888 A1 9/2005 Drummond et al.
2005/0218214 A1 10/2005 Gravelle et al.
2005/0222906 A1 10/2005 Chen
2005/0234769 A1 10/2005 Jain et al.
2005/0234773 A1 10/2005 Hirst et al.
2005/0240474 A1 10/2005 Li
2005/0240477 A1 10/2005 Friday et al.
2005/0242179 A1 11/2005 Warwick
2005/0246289 A1 11/2005 Alexander et al.
2005/0251446 A1 11/2005 Jiang et al.
2005/0251470 A1 11/2005 Sullivan
2005/0256794 A1 11/2005 Colby
2005/0261972 A1 11/2005 Black
2005/0267800 A1 12/2005 Tietzen et al.
2005/0273386 A1 12/2005 Weidner
2005/0273387 A1 12/2005 Previdi
2005/0278215 A1 12/2005 Seele, Jr.
2005/0288998 A1 12/2005 Verma et al.
2005/0289003 A1 12/2005 Thompson et al.
2006/0004629 A1 1/2006 Neemann et al.
2006/0010033 A1 1/2006 Thomas
2006/0010034 A1 1/2006 Sparks
2006/0011719 A1 1/2006 Lehtonen et al.
2006/0012473 A1 1/2006 Bishop et al.
2006/0020507 A1 1/2006 Sagey
2006/0026073 A1 2/2006 Kenny et al.
2006/0036553 A1 2/2006 Gupta et al.
2006/0039733 A1 2/2006 Meyerhofer
2006/0041540 A1 2/2006 Shannon et al.
2006/0074698 A1 4/2006 Bishop et al.
2006/0074813 A1 4/2006 Saunders
2006/0131408 A1 6/2006 McNamara
2006/0214008 A1 9/2006 Asami et al.
2006/0219776 A1 10/2006 Finn
2006/0255155 A1 11/2006 Cranston et al.
2007/0129955 A1 6/2007 Dalmia et al.
2007/0131759 A1 6/2007 Cox et al.
2007/0203825 A1 8/2007 Hanifin et al.
2007/0251999 A1 11/2007 Bohlke, III et al.
2007/0265924 A1 11/2007 Schwarz
2007/0276929 A1 11/2007 Allen et al.
2008/0010202 A1 1/2008 Schwarz
2008/0067247 A1 3/2008 McGregor et al.
2009/0043651 A1 2/2009 Schwarz
2009/0192906 A1 7/2009 Rau et al.
2009/0289106 A1 11/2009 Bishop et al.

FOREIGN PATENT DOCUMENTS

DE 4308193 A1 9/1994
EP 0061373 9/1982
EP 0254595 A2 1/1988
EP 0465456 A1 8/1992
EP 0855659 7/1998
EP 959440 A2 11/1999
GB 2154832 A 9/1985
GB 2267626 A 8/1993
GB 2275654 A 9/1994
GB 2376787 A 12/2002
GB 2377071 A 12/2002
GB 2377314 A 1/2003
WO WO 88/03296 5/1988
WO WO 90/14644 11/1990
WO WO 91/14237 9/1991
WO WO 94/22115 9/1994
WO WO 94/29112 12/1994
WO WO 97/41673 11/1997
WO WO 97/45814 * 12/1997 ................ G07F 7/08
WO WO 98/37524 8/1998
WO WO 98/59307 12/1998
WO WO 99/05633 2/1999
WO WO 01/69347 A2 9/2001
WO WO 2005/043277 A2 5/2005

OTHER PUBLICATIONS

Song, A Card That Asks for ID, Tlme Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs the Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.

(56) References Cited

OTHER PUBLICATIONS

CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First Data unit develops Blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Incentive Firms Find Debit Cards A Rewarding Experience (Off-line debit card issuers converge efforts with companies looking for effective incentives to boost employee productivity and to motivate individuals to buy their products), Debit Card News, Vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Meridian Award Cards, JA8251.
Card Based Award Systems, JA8309.
Meridian-the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Dugas, Payroll May Ask: Paper or Plastic?, USA Today, 3B, Aug. 14, 2001, 1 page.
Brown et al., Purchasing Card Magic: Eli Lilly Finds Accounts Payable Flying High With Plastic, Corporate Cashflow, vol. 15, No. 12, Nov. 1994, 2 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Wuarterly, v82, n3, p. 1(25), ISSN: 1069-7225, 17 pages.

(56) References Cited

OTHER PUBLICATIONS

Lazarony, Stuck for a gift? Give a prepaid credit card, www.bankrate.com, Dec. 21, 1998, 1 page.
Key, Swift Gift Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases Visa Cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.
American Bankers, A Glossary of Computer Technology Terms, American Banker Publications, vol. 154, No. 209, Oct. 25, 1989.
Bragg, Steven M., Accounting Best Practices, John Wiley and Sons, Inc., 1999.
BSI2000 Files Patent Application for Optical Bank Card Press Release, printed Apr. 27, 2004.
Card Flash, Daily Payment Card News, www.CardWeb.com, printed Aug. 10, 2004.
Dvorak, Smartcards Get Smarter, www.forbes.com, Jun. 1, 2001.
Gilhooly, Smart Cards, Smart Move?, Computerworld, May 21, 2001, pp. 1-5.
Hesseldahl, China Goes Smartcard Crazy, www.forbes.com, Jun. 12, 2001.
Hesseldahl, Stock Focus Smartcard Companies, www.forbes.com, Jun. 18, 2001.
Hesseldahl, U.S. Getting Wise to Smart Cards, Forbes.com, May 25, 2000.
Levin, Leveraging Business Method Patents to Protect Broad Business Interests—A Technology Company Study; 4th Annual Patenting Business Methods in the Financial Services Industry Conference, Jul. 24-25, 2007.
Nokia Announces the World's First NFC Enabled Mobile Product for Contactless Payment and Ticketing, PRNewswire, Feb. 9, 2005.
Proton world and Europay to co-operate in creation of new CEPS-compliant e-purse application, Press Release 1999, Waterloo, Belgium, Jun. 28, 1999, 2 pages.
Purse Application for Cross Border Use in Euro, Cordis, Pace 1st 1999-11531 Pace, www.cordis.lu, printed Feb. 23, 2001, 3 pages.
Rankl, W., et al., Smart Card Handbook Second Edition (2000).
RFID Tags, Contactless Smart Card Technology and Electronic Passports Frequently Asked Questions, www.smartcardalliance.org, Feb. 17, 2005.
RFID Tags, Contactless Smart Card Technology Comparing and Contrasting Applications and Capabilities, www.smartcardalliance.org, Feb. 17, 2005.
Schwartz, Digital Cash Payoff, Dec. 2001.
Sotto, An RFID Code of Conduct, RFID Journal, Featured Opinions, May 30, 2005.
The Illustrated Dictionary of Electronics, 6th Edition, Blue Ridge Summit, PA, p. 648, Dec. 1994.
Transponders: Cash in a Flash, www.forbes.com, Jul. 31, 2001.
Visa, MBNA and De La Rue Launch Multi-Function Smart Card Program, www.findarticles.com, Jul. 6, 1998.

* cited by examiner

SYSTEM AND METHOD FOR TRANSPONDER-ENABLED ACCOUNT TRANSACTIONS

RELATED APPLICATIONS

This application is a continuation of U.S. patent application Ser. No. 09/630,595, filed on Aug. 1, 2000 now abandoned.

FIELD OF THE INVENTION

The invention relates to the field of electronic commerce, and more particularly to the use of transponder-activated account transactions at point of sale or other locations.

BACKGROUND OF THE INVENTION

The use of electromagnetically-coupled transducers for commercial transaction processing has become increasingly popular in recent times. The advent of compact, inexpensive electronics, transponder-equipped point of sale equipment, and attendant information processing assets have enabled a variety of vendors to offer account-linked transaction systems. Those systems include, for example, subway or other transportation devices, telephone calling devices, and others such as the SpeedPass™ offered by Mobil Corp. for gasoline point of sale transactions. In that and other systems, a receiver emits electromagnetic signals to a device in proximity to a gasoline pump over radio frequencies (RF), activating an embedded transponder within the transaction device. The transaction device is identified by some sort of identification information, which information is then relayed from the point of sale to an offsite information processing facility. However, these types of distributed systems suffer from more than one disadvantage.

For one, transactions made according to that technology require that separate offsite computing facilities be accessed, since the transponder in encoded with information identifying the transponder but not the account information necessary to complete the transaction. Processing times and time to completion of transactions are therefore increased, and the expense of linking and maintaining information processing facilities to service the point of sale request is significant. Moreover, the initiation of new accounts to use such wireless vending points requires backend processing facilitates to enter a new user's account to the remote data processing facility, as well as to encode and associate the transponder with particular new accounts. More streamlined, convenient and flexible transaction technology is desirable.

SUMMARY OF THE INVENTION

The invention overcoming these and other drawbacks in the art relates to a system and method for transponder-activated transactions, generally involving the presentation and sensing of an electromagnetically coupled transponder to an RF-enabled point of sale system. In the practice of the invention, the transponder may be preferably encoded with not merely identifying or serializing information, but also account information which may be used to authorize or record transactions at the instant of sale, so that remote data processing may not be necessary. Users of the transponder of the invention may link the device to more than one type of account, and activate the transponder using Web or other network-enabled interfaces.

BRIEF DESCRIPTION OF THE DRAWINGS

The invention will described with reference to the accompanying drawings, in which like elements are referenced by like numerals.

DETAILED DESCRIPTION OF PREFERRED EMBODIMENTS

Figure 1:
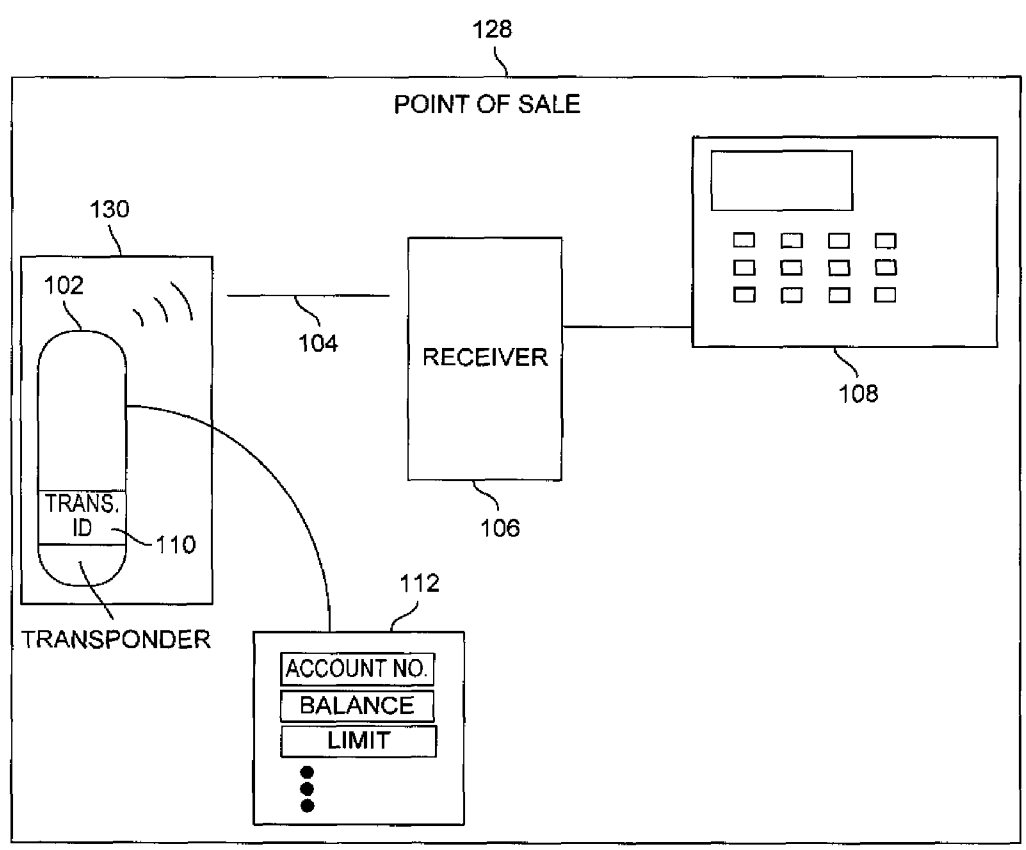
FIG. 1 illustrates an overall transaction architecture according to one embodiment of the invention.

As illustrated in FIG. 1, in a first embodiment of the invention, an overall point of sale architecture includes a transponder 102 which communicates via an RF link 104 to a receiver 106. The transponder 102 may be or include any of several known electromagnetically coupled devices, generally activated by proximity to an RF-enabled receiving unit, such as receiver 106. Transponder 102 may, for instance, contain an electromagnetic coil antenna for inductive coupling to receiver 106, thereby being energized with small but sufficient electric current to activate embedded electronics within transponder 102. Those electronics may include memory such as CMOS memory, logic gates, filters for isolating discrete transmission frequencies and other elements known in the art. In one embodiment, transponder 102 may be programmable and able to receive updated programmable instructions via RF link 104, as well as to have electronic memory erased or updated during transactions. Receiver 106 may include an electromagnetic antenna to couple with transponder 102, generally within the range of a few feet of the device.

In the embodiment illustrated in FIG. 1, the receiver 106 is connected to a point of sale (POS) device 108 for conducting a commercial or other transaction. For instance, the point of sale device 108 may be or include any of several commercially known electronic cash registers or related transaction processing equipment, such as point of sale terminals manufactured by Sharp Corp. or others. In one embodiment of the invention, transponder 102 may be embedded within a personal article for convenience, aesthetic and affinity purposes. In that regard, the invention has been integrated in one implementation within a fully functional watch manufactured by the Swatch Corporation. Embedding in other personal articles, such as key chains, pagers, clothing or other items is also possible.

In the operation of the invention, a user who has subscribed to the account system of the invention may approach the receiver 106 at the point of sale device 108 to initiate and complete a purchase or other transaction, such as at a restaurant or grocery market checkout line, or other points of sale. In the embodiment illustrated in FIG. 1, transponder 102 contains an encoded transponder ID 110, which may for instance be a 5-digit number or other identifying information. In this embodiment, transponder 102 may also store an account table 112 directly recording account information for the subscribed user of the transponder 102. The account table 112 may be or include, for instance, an indication of an account number, balance, limit and other information for a debit account, a cash account, a credit card account, special premises account for internal use such as by employees, or other account information associated with users of the system.

In the implementation of this embodiment of the invention, receiver 106 is configured to receive the account table 112 and apply an amount being executed at the point of sale device 108 to the account reflected within the account table 112. For instance, a patron who has subscribed to an account according to the system of the invention may approach receiver 106 in a restaurant line and wave a watch or other article containing transponder 102 in proximity of the receiver 106. When transponder 102 comes within range of receiver 106, transponder 102 may be inductively coupled to the coils of an electromagnetic antenna within receiver 106 inducing electrical energy within transponder 102, to establish the RF link 104 with the receiver 106. Upon activation of transponder 102 and radiation of transponder ID 110 to the receiver 106, the receiver 106 may respond with an acknowledge signal to the transponder 102. The point of sale device 108 may indicate on a display screen or otherwise that a transaction is ready to be commenced. Once the point of sale device 108 generates total amount due for the transaction, the receiver 106 may interrogate transponder 102 to obtain account table information from account table 112 for application to the sale.

For instance, if a patron has purchased a meal in a restaurant line at point of sale device 108, the total purchase price may be validated against available credit, available cash or other account-specified balances within account table 112 for completion of the transaction. Conversely, if the amount of the transaction cannot be validated against account table 112, the point of sale device 108 may indicate "cash required" or another message that transponder validation or authorization has failed. If the transaction amount is validated, receiver 106 enters the transaction amount, recalculates an account balance for storage within account table 112 and transmits the revised account table 112 information over the RF link 104 to the transponder 102. A transaction completion signal may be emitted by receiver 106, which in one embodiment may turn off or decouple the transponder 102 via RF link 104.

Among other advantages, because the receiver 106 and other transaction elements do not need to resort to offsite transaction processing, conduct of the transaction from initiation through approval and completion are completed quickly, often virtually instantaneously to a subscriber at the point of sale. It may be noted that receiver 106 and point of sale device 108 may be configured to execute a variety of other types of transactions, such as retail checkouts of books, movies or other media, and other transaction events.

Figure 3:
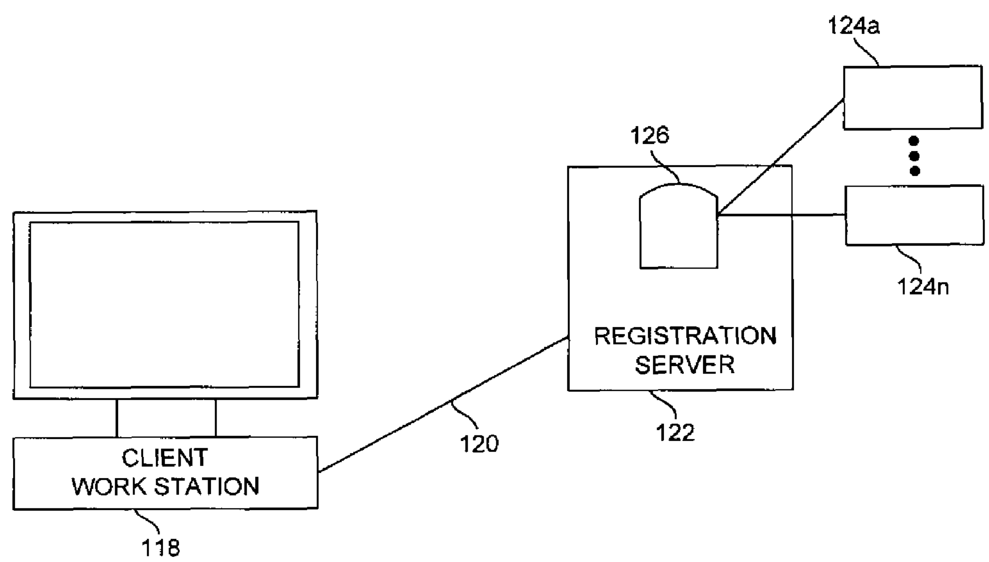
FIG. 3 illustrates an activation architecture for the initiation of user accounts according to the invention.

In terms of new accounts registration as illustrated in FIG. 3, in the invention a network-based activation architecture may be advantageously employed. As shown in the figure, a new user may access a client work station 118 connected via communications link 120 to a registration server 122. The communications link 120 may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections.

Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

The registration server 122 may be or include, for instance, a workstation running the Microsoft Windows™ NT™, Windows™ 2000, Unix, Linux, Xenix, IBM AIX, Hewlett-Packard UX, Novell Netware™, sun Microsystems Solaris™, OS/2™, BeOS™, Mach, Apache, OpenStep™ or other operating system or platform.

The registration server 122 may communicate with client workstation 118 to receive preassigned information related to transponder 102, such as transponder ID 110 which may be printed by sticker on a watch or other article housing the device, for entry into a database 126 within registration server 122 and the setting up of an account. The account may illustratively include or be more than one type of account 124*a* . . . 124*n*, such as cash accounts, debit accounts, credit card accounts, special purpose vending accounts, telephone card accounts, or others. The registration server 122 may validate the transponder ID 110, and interrogate a new subscriber at client work station 118 to identify or select which one or more of accounts 124*a* . . . 124*n* the user wishes to associate with the transponder 102.

For instance, the registration 122 may accept a preexisting credit card number for registration with the transponder 102 and execution of future transactions. Once new account information is established, the registration server 122 may communicate via network connection to receiver 106 to update subscriber registration tables within the database 126, receiver 106, point of sale device 108 or other associated hardware to authorize transactions at the point of sale. The paperwork, delay, possibility for error and other drawbacks of paper-based back end account registration is thereby avoided.

Figure 2:
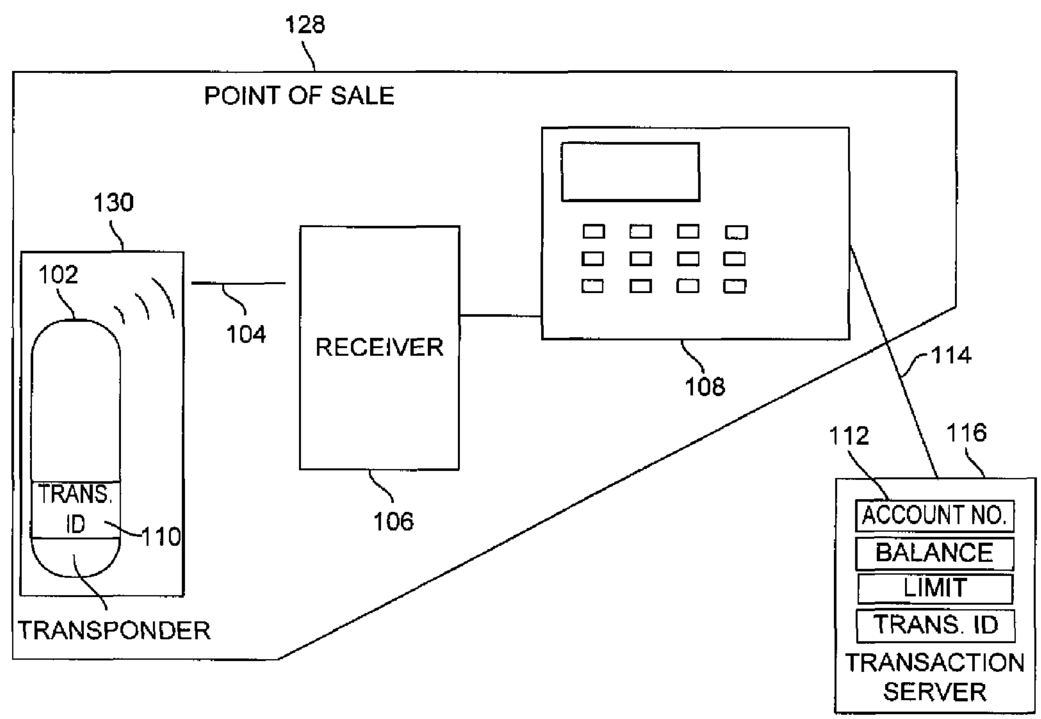
FIG. 2 illustrates an overall architecture of the invention according to a second embodiment of the invention.

A second illustrative embodiment of the invention is shown in FIG. 2, generally involving a processing architecture similar to that of FIG. 1. In this embodiment, a transponder 102 again communicates via RF link 104 with receiver 106 to effectuate point of sale or other transactions. However, in the embodiment of FIG. 2 a portion or all of account table 112 or other information stored in transponder 102 in the first embodiment may be offloaded to economize on the necessary electronics, power consumption and other properties of transponder 102. In the embodiment illustrated in FIG. 2, the point of sale device 108 is additionally connected to a transaction server 116 via communications link 114, for the purpose of authorizing in whole or in part transactions presented for payment using transponder 102. Communications link 114 may be, include or access communications resources similar to communications link 120.

In this embodiment, part or all of the information of account table 112 may be stored in hard disk or other storage of transaction server 116. Transaction initiation begins in the same manner as the embodiment illustrated in FIG. 1, however, after acknowledgments are exchanged between point of sale device 108 and transponder 102 and a transaction is set up, the point of sale device 108 may communicate with transaction server 116 to validate a transaction amount or other information against account information stored in the transaction server 116.

While this implementation involves additional hardware and communications link 114, if transaction server 116 is co-located with the point of sale device 108, such as in a restaurant or retail outlet, communication delays may be minimal. Furthermore if the transaction server 116 is dedicated to processing transactions only at the site of point of sale device 108 or closely grouped facilities, processing burdens may be comparatively modest. In another embodiment of the invention, transaction server 116 may communicate with remote credit file databases or other information resources before authorizing or completing a transaction initiated over RF link 104 at receiver 106, when circumstances may permit some execution delay to be acceptable. Alternatively, in another embodiment of the invention the point of sale device 108 may perform a preliminary authorization for transactions presented at the receiver 106, to collect and temporarily store transactions, for instance over 2 or 3 hour periods, for batch processing remotely via transaction server 116. Since the majority of transactions typically reconcile without difficulty, this implementation permits more-immediate completion while still checking on account validations at frequent intervals.

Figure 4:
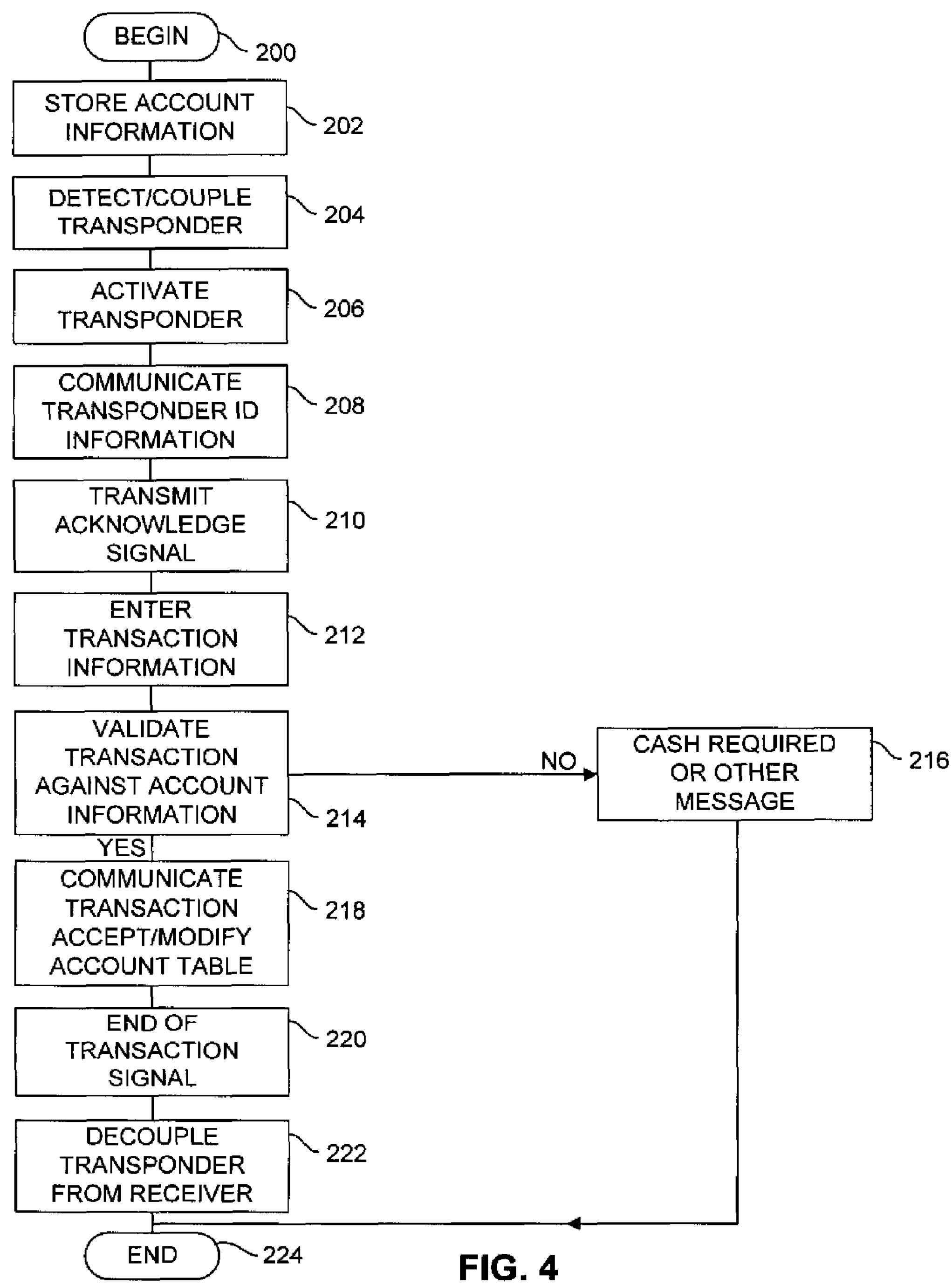
FIG. 4 illustrates a flowchart of transaction processing according to the invention.

Overall transaction processing is illustrated in the flowchart of FIG. 4. In step 202, processing begins. In step 204, the receiver 106 is presented with transponder 102 within range of electromagnetic coupling, such as inductive coupling. In step 206, transponder 102 is activated, for instance by inductive energization of its circuitry. In step 208 transponder 102 may communicate transponder ID 110, which the receiver 106 acknowledges with an acknowledge signal over RF link 104 in step 210.

In step 212, transaction information such as purchase amount is entered at point of sale device 108, for instance by a check out clerk or other attendant. In step 214, transaction table 112 or other account information may be interrogated to determine whether account balances or other account parameters permit the pending transaction at the point of sale device 108. If the transaction is not validated, in step 216 a "cash required" or other message is signaled at point of sale device 108, and processing proceeds to step 224 whole processing ends.

If the account to be applied to the pending transaction is validated at step 214, in step 218, the point of sale device 108 and receiver 106 communicate with transponder 102 to indicate transaction acceptance, and modify information within account table 112 if appropriate. In step 220, an end of transaction signal is sent to transponder 102 and in step 222, transponder 102 decouples from the receiver 106. In step 224, processing ends.

The foregoing description of the system and method for transponder-activated transactions is illustrative, and variations in configuration and implementation will occur to persons skilled in the art. For instance, while transponder 102 has been described as electromagnetically coupling with the receiver 106, or other types of detection and coupling could be used. For instance, an infrared device, a biometrically enabled or other device may be presented to corresponding detecting apparatus at the point of sale. Similarly, transponder 102 may contain or store other types or forms of information other than transponder ID 110 and account table 112. The scope of the invention is accordingly intended to be limited only by the following claims.

What is claimed:

1. A computer implemented method of authorizing transponder-enabled transactions, comprising:

providing a RFID transponder to a user, for transmitting transponder identification information over a communications channel, the RFID transponder being configured for inclusion in or on a wireless communications device, wherein the wireless communications device communicates independently of the RFID transponder;

receiving the RFID transponder identification information emitted from the RFID transponder, wherein the emission occurs upon presentation of the RFID transponder during a transaction at a point of sale device for payment of an amount;

retrieving financial account information from an account table, wherein the account table comprises financial account information linked to the RFID transponder identification information, and the financial account information comprises at least one of: account number information, account type information, account balance information, and account limit information;

determining whether the transaction charging the payment amount to a financial account represented by the financial account information is authorized based on the retrieved financial account information;

communicating an authorization to the point of sale device and the transponder;

modifying the financial account information in the account table based on the authorization and the transaction;

wherein the RFID transponder identification information comprises information that is distinct from the financial account information, and receiving registration information, at a registration server, from a workstation via a network registration interface, the registration information comprising the financial account information and the RFID transponder identification information, comprising a transponder identification number preprinted on a sticker associated with the RFID transponder, and wherein the registration information is received from the user;

linking, based on the registration information, the financial account information to the RFID transponder identification information in the account table.

2. The method of claim 1, further comprising:

receiving the RFID transponder identification information at a transaction server.

3. The method of claim 2, wherein the transaction server is coupled to the point of sale device by a communications link.

4. The method of claim 1, wherein the user is a holder of the financial account.

5. The method of claim 1, wherein at least part of the account table is located remotely from the RFID transponder.

6. The method of claim 1, wherein the financial account comprises at least one of:

a credit card account, a debit card account, a cash account, a special premises account for use by employees of an entity, a special purpose vending account, and a telephone card account.

7. The method of claim 1, wherein the wireless communications device comprises a pager.

8. The method of claim 1, wherein the point of sale device is located at one or more of: a restaurant, a grocery store, or a retail outlet.

9. A computer implemented system for authorizing transponder-enabled transactions, comprising:

a communications link;

a transaction server, programmed to receive RFID transponder identification information emitted from a RFID transponder, transmitted on a first communications channel, and communicatively coupled, over the communications link, to a point of sale device, wherein the RFID transponder identification information is emitted upon presentation of the RFID transponder for payment of an amount at the point of sale device and the RFID transponder is provided to a user for inclusion in a wireless communication device that communicates independently of the RFID transponder;

an account table, comprising stored financial account information linked to at least some of the RFID transponder identification information, communicatively coupled to the transaction server such that the account table is modified following an authorization for the transaction, wherein the transaction server is further programmed to search and retrieve from the account table financial account information linked to at least some of the received RFID transponder identification information, the account table, wherein the financial account information comprises at least one of: account number information, account type information, account balance information, and account limit information;

an authorization unit programmed to authorize a charge for the payment amount to a financial account associated with the financial account information, wherein the authorization unit is in communication with the transaction server and wherein the RFID transponder identification information comprises information distinct from financial account information; and a registration unit, programmed to register the financial account information via a network registration interface, in communication with the account table and at least one client workstation, the registration unit receiving the at least some financial account information and the at least some transponder identification information, comprising a transponder identification number preprinted on a sticker associated with the RFID transponder, from the at least one client workstation, and linking the received financial account information with at least some of the transponder identification information in the account table, wherein the at least some transponder identification information is received from the user.

10. The system of claim 9, wherein the transaction server is further programmed to communicate an authorization over the communications link to the point of sale device.

11. The system of claim 9, wherein the financial account comprises at least one of: a credit card account, a debit card account, a cash account, a special premises account for use by employees of an entity, a special purpose vending account, and a telephone card account.

12. The system of claim 9, wherein the wireless communication device comprises a pager.

13. The system of claim 9, wherein the point of sale device is located at one or more of: a restaurant, a grocery store, or a retail outlet.

14. The system of claim 9, further comprising:

an RF receiver for receiving the RF transponder identification information from the RF transponder, wherein the RF receiver is communicatively coupled to the point of sale device.

15. A computer implemented method of authorizing transponder-enabled transactions, comprising:

providing a RFID transponder to a user, wherein the RFID transponder transmits information on a communications channel, wherein the wireless communications device communicates independently of the RFID transponder;

receiving an emission from the RFID transponder, wherein the emission occurs upon presentation of the RFID transponder to a receiver during a transaction for payment of an amount, wherein the receiver is linked to a point of sale device, the emission comprising information linked to a financial account;

retrieving financial account information from a transaction server based on the emitted information, the transaction server comprising storage, wherein the storage comprises financial account information, the financial account information comprising an account number;

determining whether the transaction charging the payment amount to the financial account represented by the account number is authorized based on the retrieved financial account information;

communicating an authorization to the point of sale device and the transponder;

modifying the financial account information in the account table based on the authorization and the transaction; and linking financial account information that is associated with one or more financial accounts linked to the user with the RFID transponder through a server comprising a registration module configured to perform the linking, the registration module being communicatively coupled to a network registration interface and at least one client workstation and wherein the linking is performed following receipt of registration information from the user and the registration information comprises at least a transponder identification number that is preprinted on a sticker associated with the RFID transponder;

wherein the linking enables the RFID transponder to be used by the user to conduct transactions using the one or more financial accounts, and wherein the financial account information comprises at least account number information.

16. The method of claim 15, wherein the inclusion of the RFID device in the wireless communications device is performed by the user.

17. A computer implemented method of authorizing transponder-enabled transactions, comprising:

providing a RFID transponder to a user, for transmitting transponder identification information over a communications channel, the RFID transponder being configured for inclusion in or on a wearable personal article or the RFID transponder is integrated with the wearable personal article and is provided to the user with the wearable personal article;

receiving the RFID transponder identification information emitted from the RFID transponder at a transaction server, wherein the emission occurs upon presentation of the RFID transponder during a transaction at a point of sale device for payment of an amount;

retrieving financial account information from an account table, wherein the account table comprises financial account information linked to the RFID transponder identification information, and the financial account information comprises at least one of: account number information, account type information, account balance information, and account limit information;

determining whether the transaction charging the payment amount to a financial account held by the user and represented by the financial account information is authorized based on the retrieved financial account information, wherein the financial account comprises: a credit card account, a debit card account, a cash account, a special premises account for use by employees of an entity, a special purpose vending account, or a telephone card account;

communicating an authorization to the point of sale device and the transponder;

modifying the financial account information in the account table based on the authorization and the transaction;

wherein the RFID transponder identification information comprises information that is distinct from the financial account information, and receiving registration information, at a registration server, from a workstation via a network registration interface, the registration information comprising the financial account information and the RFID transponder identification information, comprising a transponder identification number preprinted on a sticker associated with the RFID transponder, and wherein the registration information is received from the user;

linking, based on the registration information, the financial account information to the RFID transponder identification information in the account table.

18. The method of claim 17, wherein at least part of the account table is located remotely from the RFID transponder.

19. The method of claim 17, wherein the wearable personal article comprises a watch or an article of clothing.

* * * * *